United States Patent [19]
Woodward, deceased

[11] 3,739,158
[45] June 12, 1973

[54] SERVO SYSTEM WITH DIRECT COMPUTER CONTROL

[75] Inventor: Morton P. Woodward, deceased, late of Vestal, N.Y. by Elinor D. Woodward, executrix

[73] Assignee: Universal Instruments Corporation, Binghamton, N.Y.

[22] Filed: Dec. 29, 1970

[21] Appl. No.: 102,355

[52] U.S. Cl. ......... 235/151.11, 318/434, 318/599, 318/635
[51] Int. Cl. ............................................ G06f 15/46
[58] Field of Search ................... 235/151.1, 151.11; 318/571, 574, 599, 635, 650, 434; 90/13 R, 13.9

[56] References Cited
UNITED STATES PATENTS

| | | | |
|---|---|---|---|
| 3,559,179 | 1/1971 | Rhoades | 235/151.11 X |
| 3,525,029 | 8/1970 | Joslyn et al. | 318/599 |
| 3,560,829 | 2/1971 | Brennan | 318/599 |
| 3,253,204 | 5/1966 | Hudson et al. | 318/434 X |
| 3,369,160 | 2/1968 | Koppel et al. | 318/635 X |
| 3,372,268 | 3/1968 | Hoernes | 235/151.11 |
| 3,525,883 | 8/1970 | Iordanidis | 318/599 X |
| 3,582,746 | 6/1971 | Nye, Jr. et al. | 318/434 X |
| 3,495,775 | 2/1970 | Dicamillo | 235/151.11 X |
| 3,402,289 | 9/1968 | Burke et al. | 246/187 B X |
| 3,655,962 | 4/1972 | Koch | 235/150.2 X |

*Primary Examiner*—Eugene G. Botz
*Assistant Examiner*—Jerry Smith
*Attorney*—Fidelman, Wolffe, Leitner & Hiney

[57] ABSTRACT

A closed loop servo control system using a digital position error control means which feeds a digital to analog converted desired velocity as one input to an analog control means where said analog desired velocity is combined with the analog motor torque and motor velocity inputs to control a motor. The digital position error control means calculates the deviation from the desired position and looks up a corresponding desired velocity in a position error versus desired velocity table stored in its memory.

7 Claims, 16 Drawing Figures

INVENTOR
MORTON P. WOODWARD

LEVEL CHANGER FOR BRIDGE

BRIDGE CIRCUIT

INVENTOR
MORTON P. WOODWARD

INVENTOR
MORTON P. WOODWARD

ATTORNEY

INVENTOR
MORTON P. WOODWARD

ATTORNEY

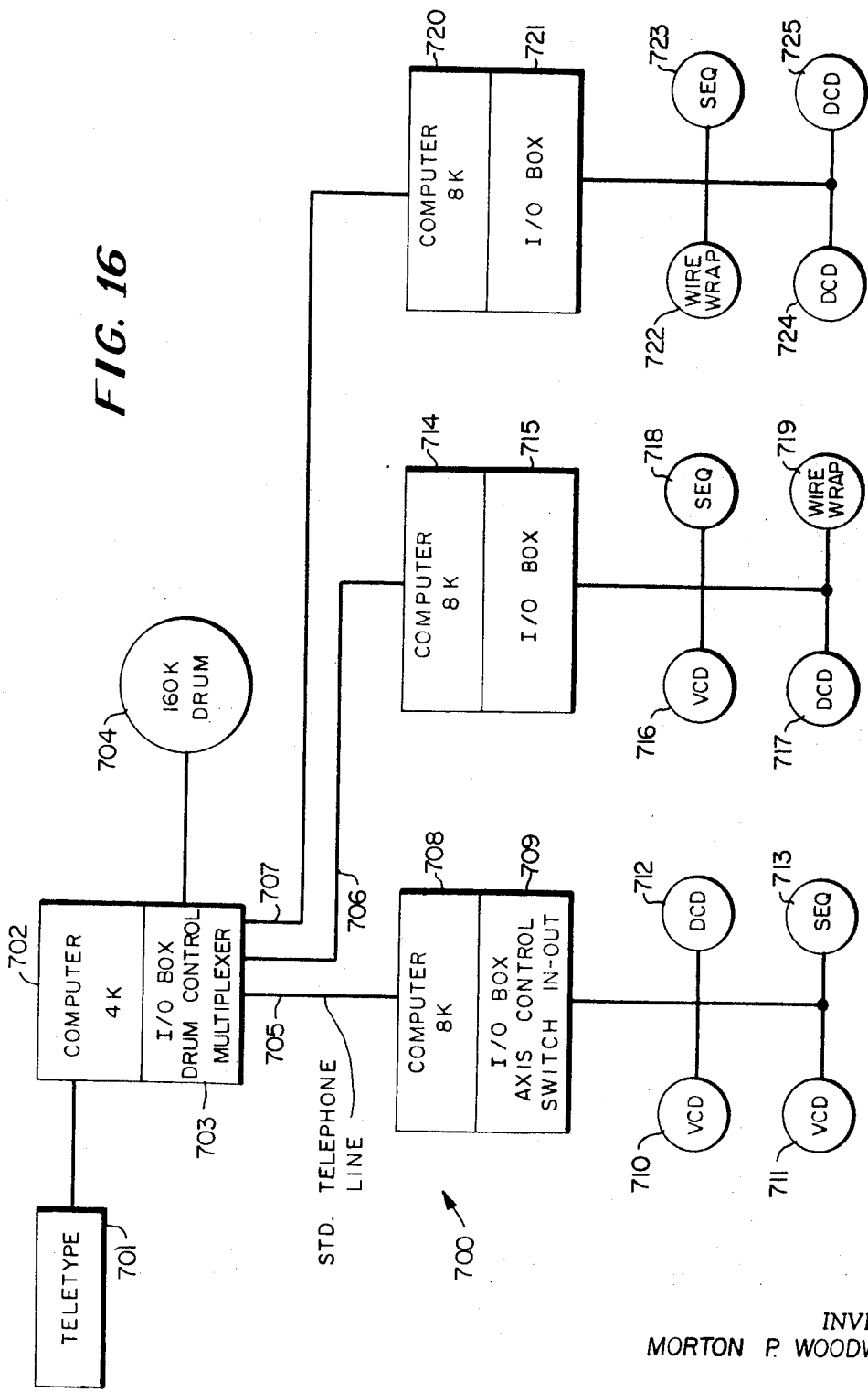

SERVO SYSTEM WITH DIRECT COMPUTER CONTROL

This invention relates to direct computer control of a servo system utilizing a closed loop system with a general purpose digital computer.

The invention involves the problem of operating machines having servo motors that position a device on X-Y or X-Y-Z axes.

In the area of computer control of machine tools, only one basic approach has been used up until now. The prior art has used a computer to provide data storage, handling, supervisory tasks, and will provide this information to the machine tool numerical control system at a tape reader interface. This type of system has been called computer directed numerical control. It has the advantage of initial programming which is only done once but it has the serious drawback of requiring a complete numerical control (N/C) controller, less tape reader, at each machine tool. Even though many machines are controlled by one computer, if the computer goes out, all machines go out. Prior art also has provided direct computer control by means of open loop control, i.e., no feedback of position, in which a stepping motor or other incremental or ratcheting device is used to convert one pulse at a time to a position. This system has disadvantages in that the speed is limited, and accuracy depends on the power drive elements.

The present invention overcomes the above disadvantages by using a computer to provide data storage, handling, supervisory tasks and the computational and logic functions for the machine tool. It consists of a small, programmed general purpose digital computer which, on a time shared basis, proceeds through a complete machine control cycle many times a second. In the program is the axis control computation which takes a desired position, compares it to actual present position and outputs a linear d.c. velocity command signal (modified position error) to a high efficiency d.c. solid state servo amplifier. A feedback routine monitors actual table position, by keeping continuous count of the number and direction of the incremental pulses referred to zero or home. These pulses can be generated by a linear or rotary encoder. These computations can be performed for any number of axes per machine. The detail cycle control logic is also handled by the program. Inputs are pulse trains or switches. Outputs are logic level signals to trigger triacs or to illuminate lights, plus a digital velocity command which is converted to analog for each servo axis.

There is no external logic performed nor are there complete external registers of any type. A partial register is used to count and store position change pulses between computer cycles at maximum slew speed, however. The system is highly efficient.

To obtain encoded feedback, linear glass scales or a rotary encoder are used which give out pulses which are then amplified.

The advantages of the system are numerous. It is a plug-in unit for 110 volts a.c. It is stable to high frequencies since servo characteristics are independent of component tolerances. There is no adjustment needed. It is much faster than conventional numerically controlled machine tools in terms of the controlled tools' production rate. It can carry on several functions simultaneously, and can readily control up to ten machines. The solid state system and the closed loop make for more positive movement. The servo characteristics can be accurately calculated and controlled for desired response, such as for critical damping. There is positive control of motor current both in acceleration and deceleration. The high efficiency and power averaging reduce the power line capacity required. Power is drawn from a single ground referenced power supply which may be shared by several drives. The high efficiency allows for the use of low cost components as the power dissipating requirements are minimized.

The system can be easily adapted for use with any of the class of general purpose computers presently available. Computers such as General Automations SPC-12, Digital Equipment Corporations PDP-8 and the Honeywell H-112 are typical of the class of general purpose computers which lend themselves well to the present system.

Accordingly, it is an object of the present invention to provide a closed loop servo system utilizing direct digital control.

It is a further object of this invention to provide direct digital control using a general purpose digital computer for a positioning servo system involving positioning along at least two axes.

It is a still further object of this invention to provide a digital computer system for running a machine tool servo system that will provide data storage, handling, supervisory tasks and the computational and logic functions for the system, thus eliminating any external logic components or registers.

It is another object of this invention to provide novel voltage and amperage feedback systems on a direct computer controlled machine tool servo system.

Another object of the present invention is to provide a direct computer control system for a machine tool servo system that is stable up to high frequencies and can be plugged directly into an 110 volt a.c. outlet.

It is a further object of the present invention to provide a machine tool computer control system that can carry on many functions in different machine tools simultaneously.

It is a further object to provide closed loop direct digital control for machine tools using a completely solid state system.

It is a further object of the present invention to provide positive control of a d.c. servo motor both in acceleration and deceleration.

It is another object of the present invention to provide a high efficiency, quick response closed loop direct digital computer control system for a X-Y axes servo motor positioning machine tool system.

These and other objects will become apparent during the preceding discussion taken with reference to the drawings in which:

FIGS. 2, 3 and 4, when arranged side-by-side, in that order, show the complete control circuitry.

FIG. 16 is a block diagram showing the present system being used to operate banks of machine tools.

Figure 1:
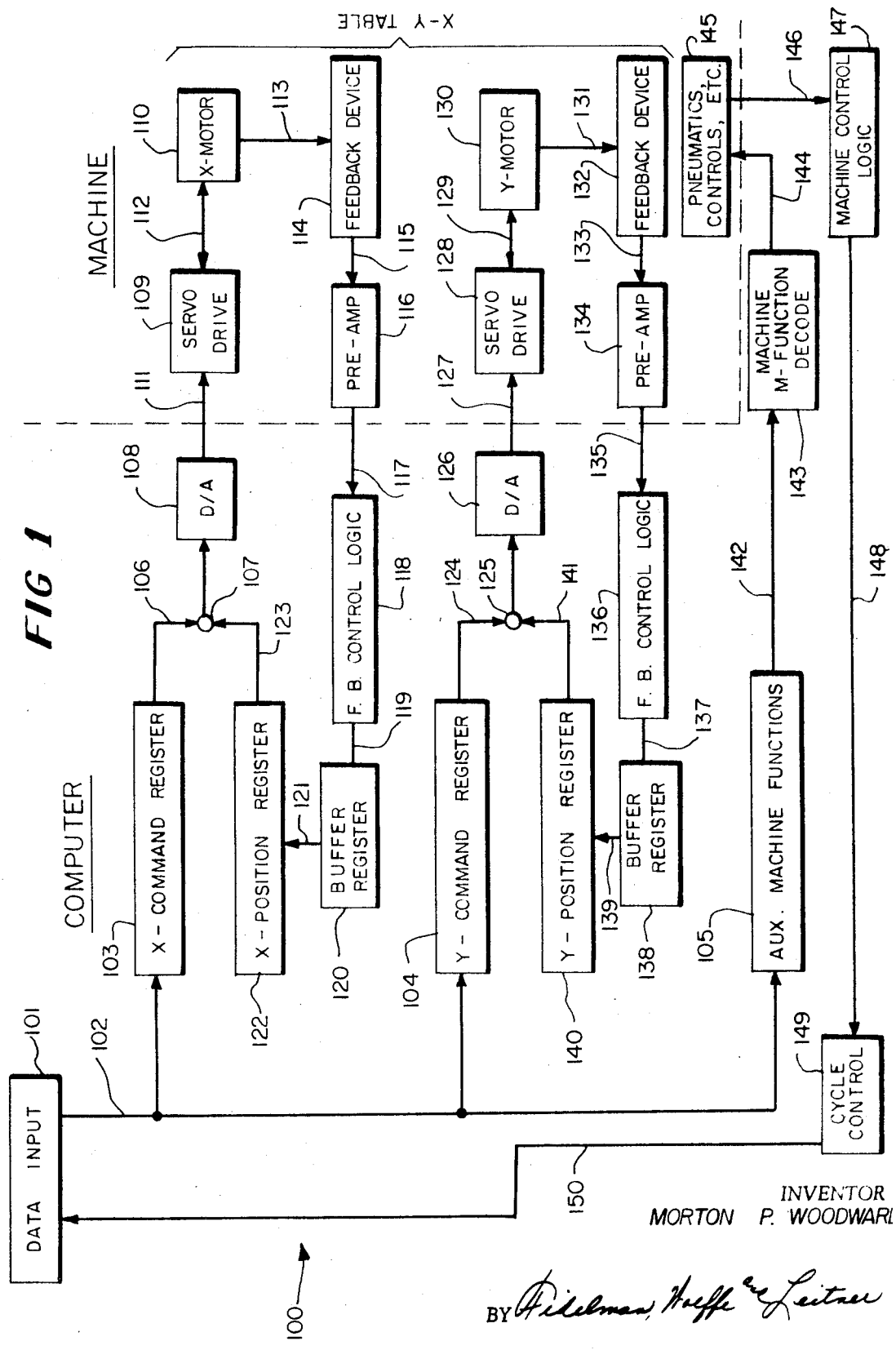
FIG. 1 is a block flow diagram of the present invention showing the arrangement of the major components of the system.

Referring now to FIG. 1, there is shown the closed loop digital computer control servo system, designated generally as 100. It consists of a general purpose digital computer listed as such to the left of the dotted lines which designate an area outside the computer.

Figure 14:
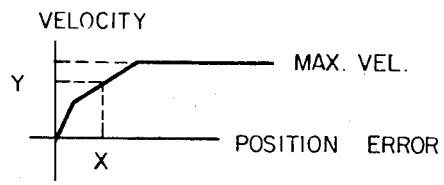
FIG. 14 is a graph showing a plot of velocity versus position error stored in the digital computer.

The data input 101 feeds the digital data to the X-command register 103 via 102 which decides where the machine should be in relation to the X-axis of the machine. It then feeds a digital word via 106 to arithmetic interface unit 107 where, a desired velocity is looked up in a velocity versus position error table as shown in FIG. 14 and sent to the digital to analog converter 108 from which an equivalent analog velocity command is sent to servo drive 109 via 111 and then to the X-axis motor 110. Motor torque and velocity information is fed back to servo drive 109 via line 112. The table position feedback signal is sent via mechanical means 113 to a pickup device 114 and via 115 to a preamplifier circuit 116. It is then fed back via 117 into the computer to control logic 118 which determines direction and then, via 119, to buffer register 120. From buffer register 120, the signal is fed to the X-position register 122 via 121 which then compares it with the command signal via 123. The same process is repeated in the Y-axis where the pulse goes, the Y-command register 104, via 124 to arithmetic unit 125, and to the digital to analog converter 126, via 127 to the servo drive 128, via 129 to the Y-axis motor 130, via 131 to feedback device 132, via 133 to the pre-amplifier 134, via 135 to the feedback control logic 136, via 137 to the buffer register 138, via 139 to the Y-position and via 141 back to 125.

Line 102 also carries commands to the portion of the computer 105 dealing with auxiliary machine functions via 142 to the machine M-function decoder, via 144 to the actual machine controls 145 and then back to the computers machine control logic 147 which acts in conjunction with cycle control 149 via 148 and back to data input 101.

Figure 2:
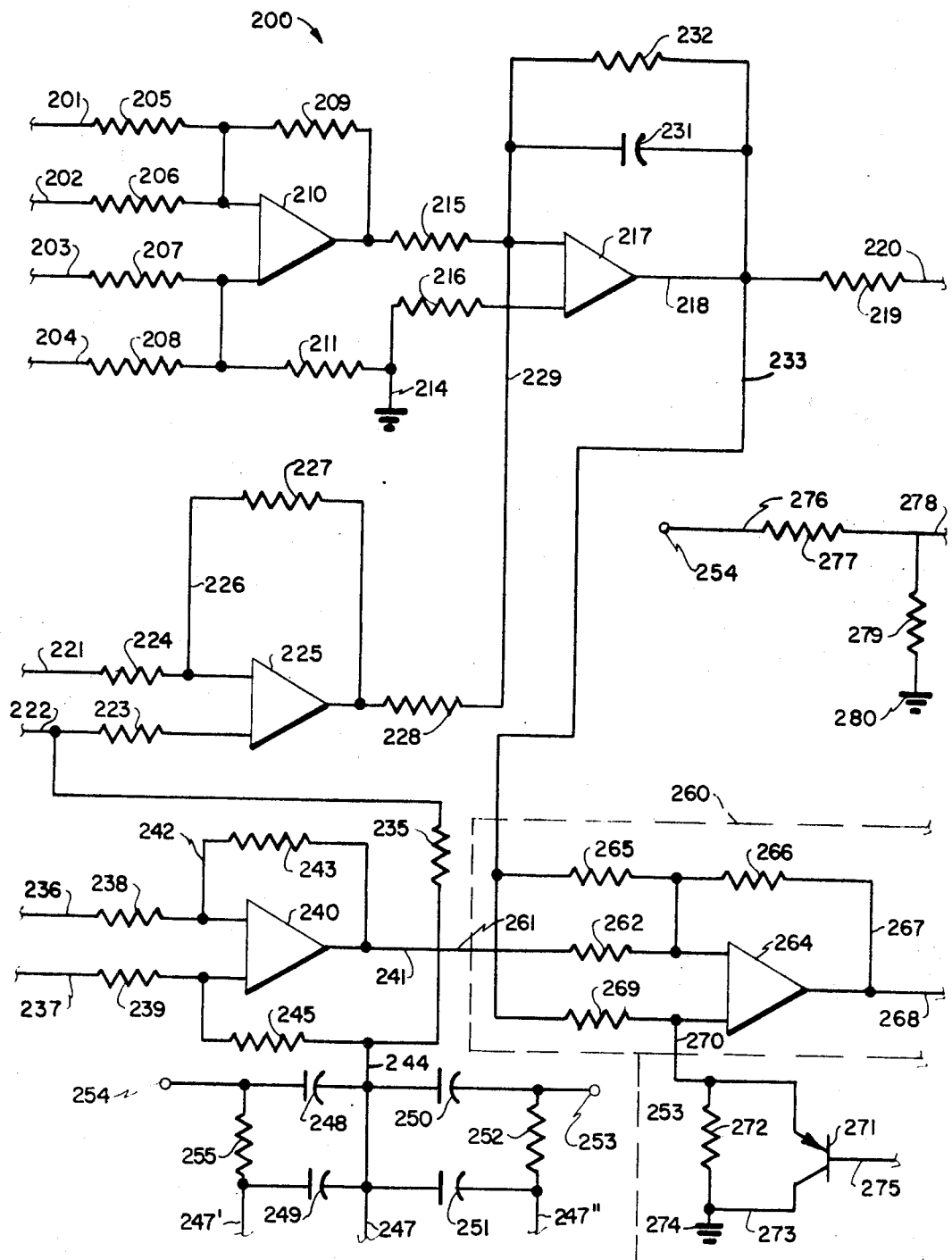
FIG. 2 is a schematic diagram of the portion of the circuitry of the system.
Figure 3:
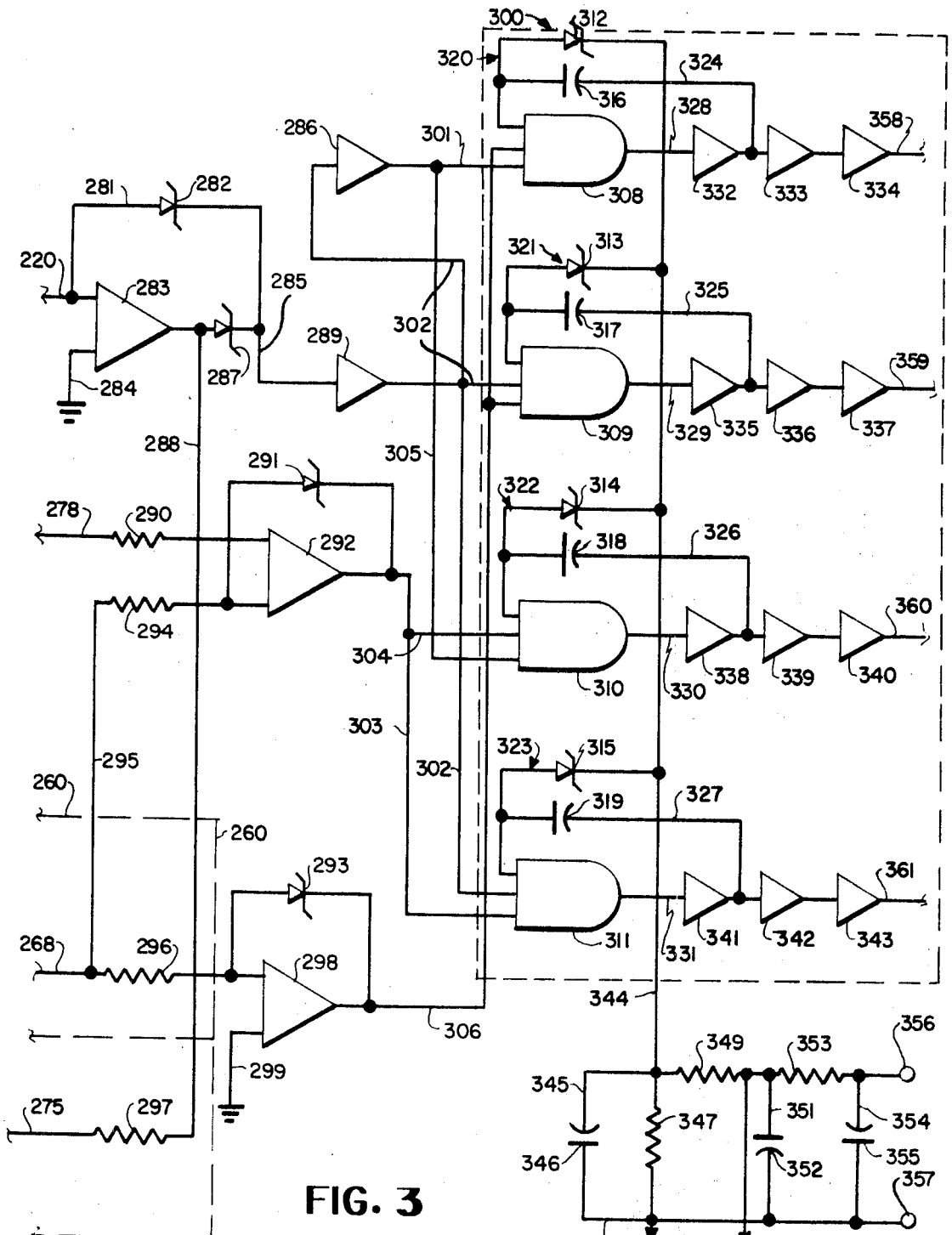
FIG. 3 is a schematic showing a further part of the control system circuitry.
Figure 4:
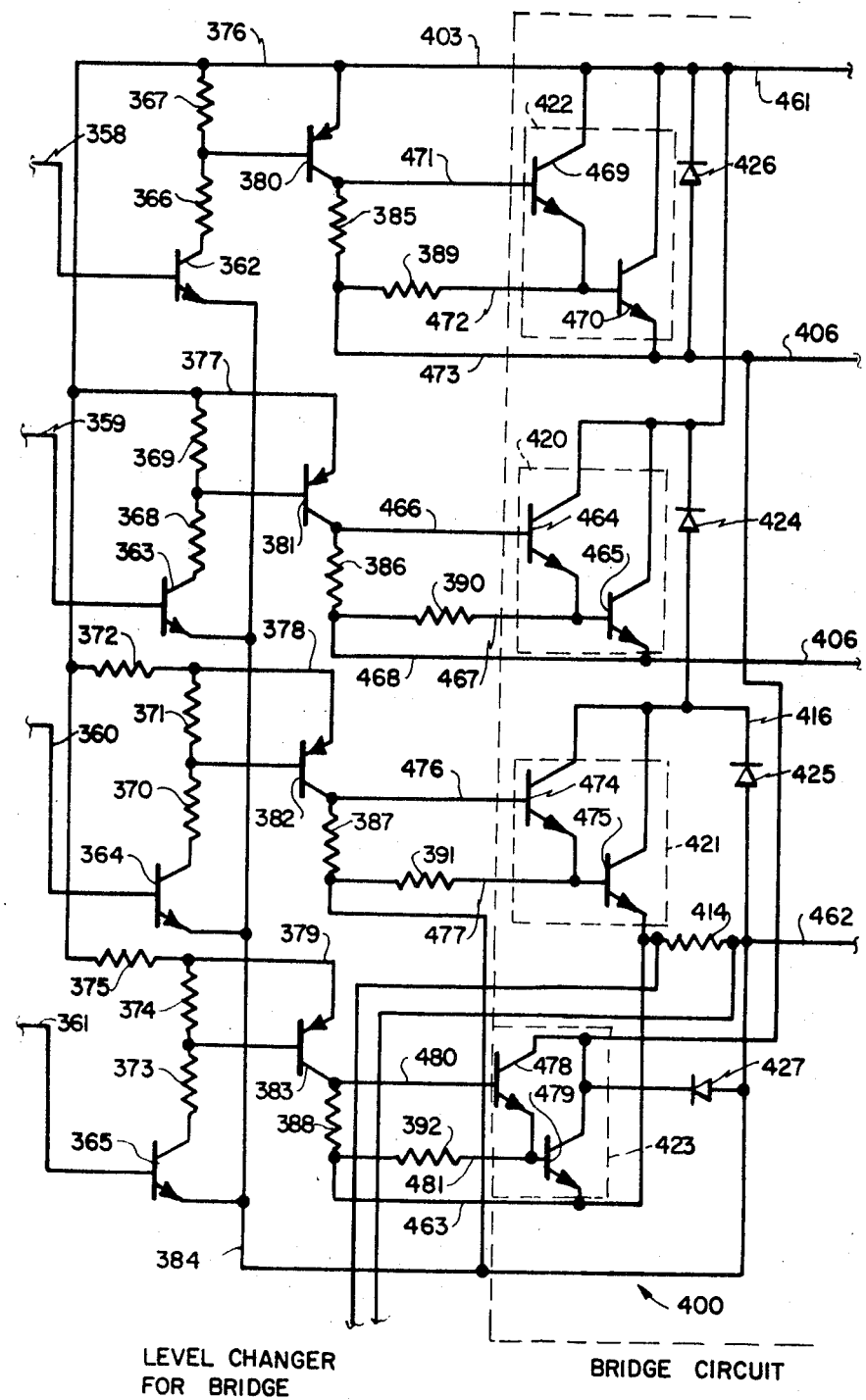
FIG. 4 is still another portion of the system circuitry showing the bridge circuit in schematic form.
Figure 6:
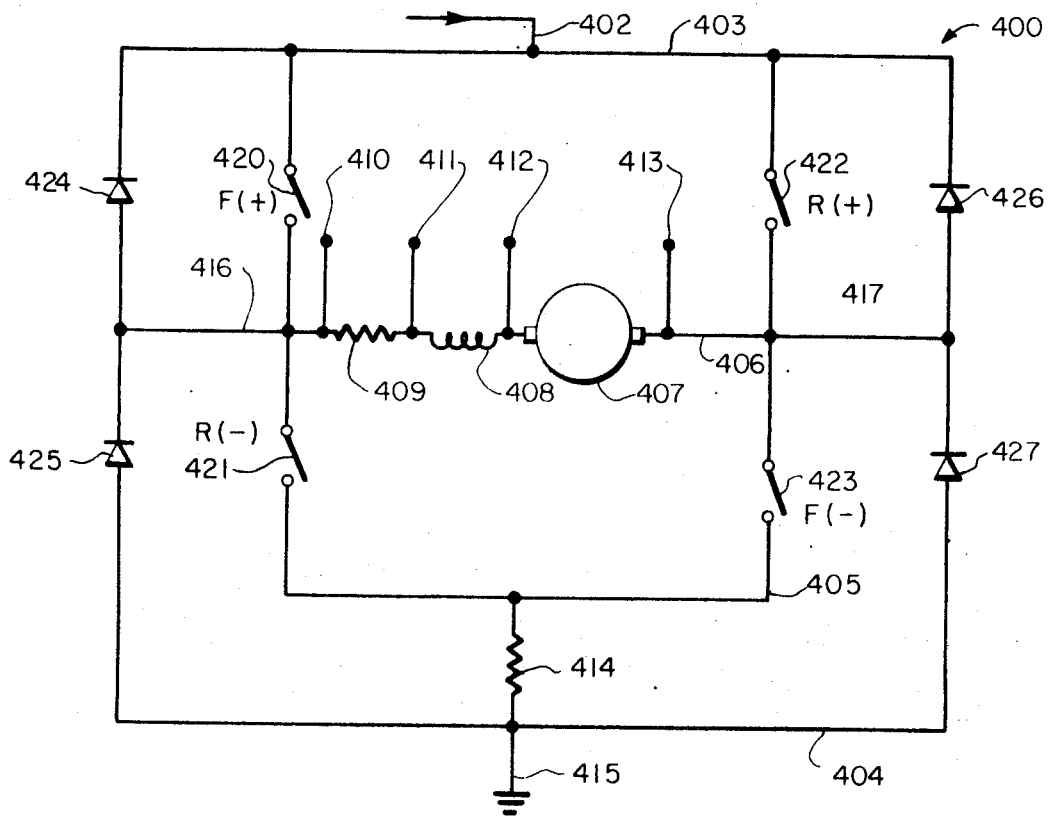
FIG. 6 is a circuit schematic showing the basic configuration of the present bridge circuit.

Referring now to FIGS. 2, 3 and 4 there is shown in detail the command circuit 200. The lines 201, 202, 203 and 204 carry the voltage feedback information and correspond with lines 410, 413, 411 and 412, respectively, in that order in FIG. 6, showing the bridge circuit diagram. The voltages are fed through resistors 205 to 208 respectively to integrated circuit amplifier 210 (FIGS. 2-4) which with resistors 209 and 211 performs the functions of scaling, adding and subtracting. The output of amplifier 210 is an analog representation of the motor velocity and is the velocity feedback signal.

The lines 221 and 222 bring in the converted digital velocity command from the digital to analog converter to integrated circuit 225. Resistors 224, 223, 227 and 235 are used to perform subtracting and scaling function to output a velocity command. The output of 225 is fed to circuit 217 where it is compared with the voltage feedback signal from amplifier 210.

Lines 236 and 237 are employed to supply the current feedback from resistor 414 to the system. The current signal passes through resistors 238 and 239 to integrated circuit 240, which with resistors 243 and 245 performs a subtracting and scaling function. The output of amplifier 240 is a representation of absolute motor current. The output from integrated circuit 240 is fed via line 241 and resistor 262 to integrated circuit 264.

Also, circuit 217, in conjunction with resistor 232 and capacitor 231 feed the velocity error signal or current command signal down line 233, through resistor 269 and into amplifier circuit 264. This signal can be plus or minus depending on the direction of the motor.

The numeral 260 generally designates an inverter circuit comprising switch 271, a transistor along with its resistors 272 and 297 (FIG. 3), ground 274 and circuit line 273 and integrated amplifier circuit 264 with its resistors 262, 265, 266, 269 and 296 and line 267. The inverter circuit 260 either adds or subtracts the signal from amplifier 217. The amplifier circuit 264 compares the actual current from the feedback and the current command signal from circuit amplifier 217. Switch 271 either shorts out the input from resistor 272 to amplifier circuit 264 to obtain addition or doesn't short it to give a subtraction.

Thus, the signal fed out line 268 is a current error signal and it is fed to integrated amplifier circuit 298 which acts as a current drive control.

The current command signal from amplifier 217 is also fed through line 220 and resistor 219 to amplifier 283 and diode 282. Amplifier 283 is a forward detect circuit and has a feedback line 281 with diode 282 thereon and ground 284. Its signal is fed through diode 287 to line 285 which brings it to a single inverter integrated circuit 289. The output of inverter 289 tells which switches, i.e., the forward or reverse, to turn on. The output of amplifier 283 is also used to switch transistor 271 to determine the mode of operation of circuit 260. Amplifier 264 output is level changed and limited by amplifier 298 and thence used to control the selected current drive switch via gates 308 and 309 via line 306. The signal from amplifier 264 is also fed to amplifier 292 via line 295 and resistor 294. Amplifier 292 is an over current circuit and, in conjunction with diode 291, delivers its signal via lines 304 and 303 to integrated circuits 310 and 311, respectively, which are three-input digital logic inverting gates acting to turn off the bridge minus switches if over-current occurs.

A line 302 connects the output of inverter 289 with single inverter circuit 286 and NAND gates 309 and 311.

The four inverter gates together with their capacitors and diodes make up a logic circuit designated generally as 300. The diodes 312, 313, 314, and 315 and the capacitors 316, 317, 318 and 319 comprise time delay circuits 320, 321, 322 and 323 for inverter NAND gates 308, 309, 310 and 311, respectively.

These time delay circuits are arranged so that if a switch has recently been turned off they won't allow the switch to be turned back on for a predetermined period of time.

The outputs from these circuits and gates control the individual switches in the bridge circuits. The output along lines 328 and 324 controls the reverse plus switch 422 through three single inverters 332, 333 and 334. The output from lines 325 and 329 controls the operation of the forward plus switch 420 through single inverters 335, 336 and 337. The output from lines 326 and 330 controls the operation of the reverse minus switch 421 through single inverter circuits 338, 339 and 340. The output from lines 327 and 331 controls the operation of forward minus switch 423 through single inverter circuits 341, 342 and 343.

The output of lines 358, 359, 360 and 361 are passed through a level changer circuit before they reach the bridge circuit. Essentially, the level changer circuit consists of a two-transistor control for each switch.

The signal along line 358 is modified by transistors 362 and 380 and resistors 366, 367, 385 and 389 before it enters the bridge circuit. The signal along line 359 is similarly affected as it passes through transistors 363 and 381 and resistors 368, 369, 386 and 390. Transistors 364 and 387 and resistors 370, 371, 372, 382 and 391 alter the signal coming in along line 360. The signal along line 361 is changed in level by transistors 365 and 383 and resistors 373, 374, 375, 388 and 392. A common input line 376 joins with main power line 403 of the bridge circuit.

Referring back to FIG. 2, there is shown a line 247 coming off of line 244 adjacent amplifier 240. The circuit connected thereto is a power supply filtering system including capacitors 251, 248, 249 and 250 and resistors 252 and 255. Line 247 is adapted to be connected to an analog ground, line 247' to a plus 15 volt D.C. source and line 247'' to a minus 15 volt D.C. source. Lead 254 is a filtered plus 15 volt connection to one of the pins of amplifiers 210, 217, 225, 240, 264, 283, 292 and 298 while lead 253 is a filtered minus 15 volt connection to another pin of the same amplifiers. Also, there is shown (FIG. 2) another lead 254 on the end of line 276. This is the common point connection as lead 254 adjacent resistor 255.

In FIG. 3, lead 348 connects with a digital ground and lead 349 with plus 5 volts D.C. Lead 356 is a filtered, plus 5 volt connection to a pin of gates 308, 309, 310 and 311 and single inverters 286, 289, 332-334, 335-337, 341-343, and 338-340. Lead 357 is a digital ground to another pin of the same gates and inverters.

All of these connections are merely power supply filtering.

The circuitry shown in FIGS. 2, 3 and 4 with the exception of the bridge circuit constitutes the preamplifier assembly.

Referring now to FIGS. 6-15, there is shown the bridge circuit 400 which is also shown in FIG. 4.

One of the problems encountered in the design of the present system centered around how to drive a permanent magnet D.C. motor so as to be able to put current into the motor in either direction and drive it in either direction while maintaining a high response while keeping power dissipation down. This is known as four quadrant operation. The immediate application of the bridge circuitry is to drive two or three positioning motors on an X-Y or X, Y, Z system.

Figure 7:
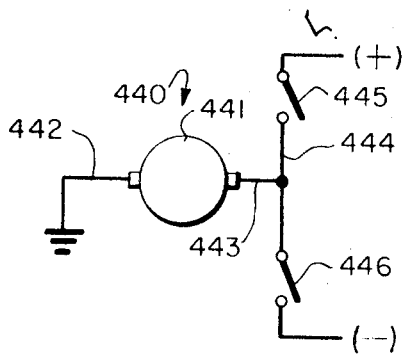
FIG. 7 is a circuit schematic of a prior art system.

One solution, referring to FIG. 7, has been to drive a D.C. motor 441 by connecting one side thereof to a ground 442 and the other side, via wire 443 to a switch circuit 444. By alternating the position of switches 445 and 446, the current can be fed to motor 441 through either switch to drive the motor in either direction. The problem with such a system is that it requires two power supplies and affords no control of regeneration.

Figure 8:
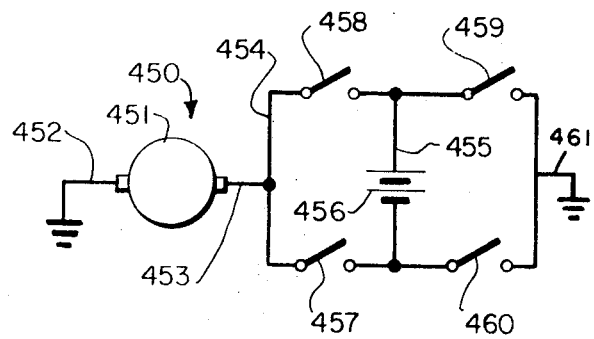
FIG. 8 is another circuit schematic of another prior art bridge circuit.

Another approach to the problem is shown in FIG. 8. A D.C. motor 451 has one side connected with a ground 452 and the other side via wire 453 to a switching circuit 454. Circuit 454 has a power source 456 thereacross and connected thereto by wire 455 and has a ground 461.

On each side of power source 456 are a pair of switches, 457 and 458, and 459 and 460. By closing switches 458 and 460, a complete circuit is formed and motor 451 is driven in one direction. To slow down, stop or drive the motor in the opposite direction, switches 458 and 460 are opened and switches 457 and 459 are closed. This action changes the power source polarity and tends to drive the motor in the opposite direction. The disadvantages in such a system are that since the system cannot be both plus and minus simultaneously, there is no control over regeneration and the system can't be shared.

The present invention is shown in FIG. 6 designated as 400. It consists of an input wire 402 connected to a main distribution line 403 which connects, in turn, with inner circuit loop 405 and outer circuit loop 404. Mounted across inner loop 405 is line 406 connecting permanent magnet D.C. motor 407 and inductance 408 and resistor 409. Wires 410, 411, 412 and 413 are employed to obtain velocity and torque information, i.e., voltage readings which are used to change the command signals to the motor.

Circuit 405 has four switches 420, 421, 422 and 423 mounted therein, one pair on each side of where line 406 crosses loop 405. Switch 420 is the forward (+) switch, i.e., it is the switch which provides current to the motor to turn in the direction designated as forward. Switch 423 is the forward (−) switch, i.e., the switch that when closed in conjunction with switch 420 completes the circuit through motor 407.

Figure 9:
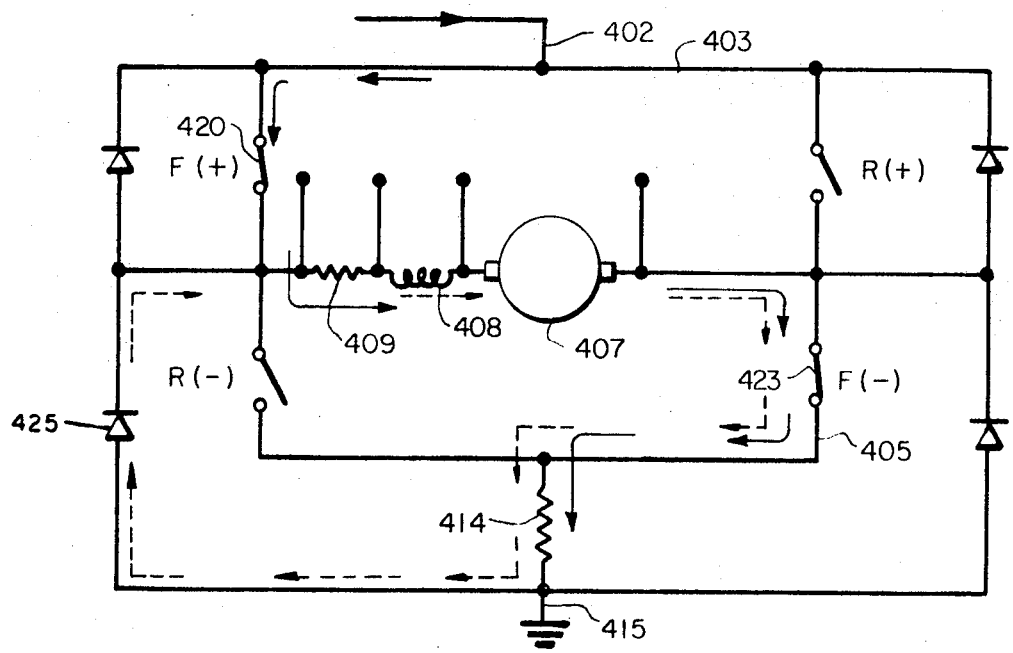
FIG. 9 is a circuit diagram showing the current flow driving the motor in a forward direction.

Looking now at FIG. 9, it is seen that when switches 420 and 423 are closed, the current flows through a portion of inner loop 405, across line 406, through motor 407; and through a second portion of loop 405.

Referring again to FIG. 6, it is seen that outer loop 404 has four diodes therein, one opposite each switch. Between each pair of switches and diodes are connector wires 416 and 417. The inner loop 405 is connected to the outer loop 404 also through a resistor 414 and is grounded through line 415.

Looking again at FIG. 9, it is seen that the current flows out of inner loop 405 through resistor 414 to ground wire 415.

When switches 420 and 423 are closed the current builds up only limited by motor 407 speed, resistance and inductance.

Figure 10:
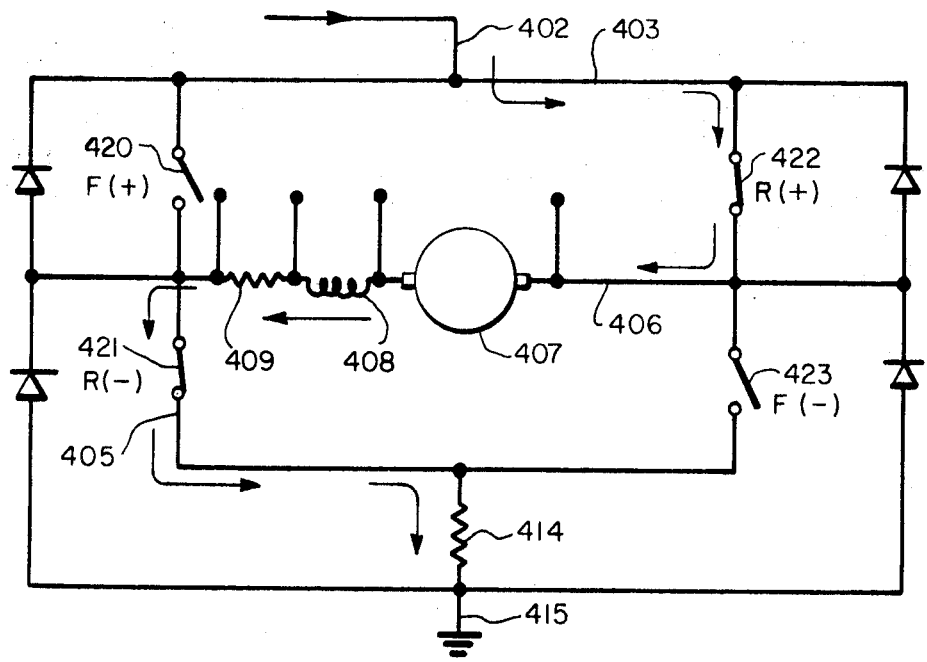
FIG. 10 is a circuit diagram showing the current flow for driving the motor in the reverse direction.

When the position desired is being approached and it is anticipated to reverse the current, switches 420 and 423 are opened and switches 421 and 422 are closed and the current is reversed as shown in FIG. 10. Switch 422 is the reverse (+) switch and switch 421 is the reverse (−) switch. In this condition, the current flows in the opposite manner to that shown in FIG. 9.

When you are running steady state in a forward direction, switch 420 is being opened and closed in order to control the motor current to the desired value.

Figure 15:
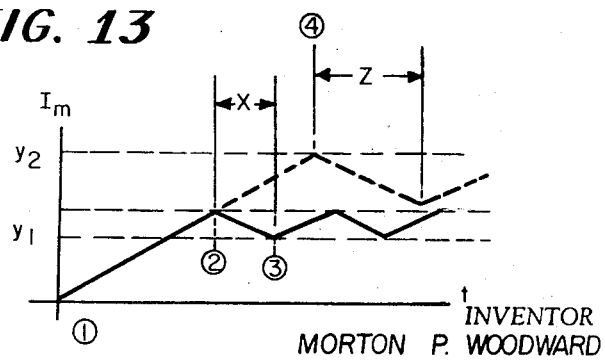
FIG. 15 is a graph showing a plot of motor current versus time.

For purposes of illustrating this fact, refer to FIG. 15. There the motor current $I_m$ is plotted against time t. At point 1, both switches 420 and 423 are closed and motor current is building up. At point 2, switch 420 is opened and the current begins to decay, until it reaches point 3, where switch 420 is again closed. During the period from point 2 to point 3, the current flows as shown in the dotted flow lines in FIG. 9. When the switch 420 is again closed, the current again flows as indicated by the solid lines in FIG. 9. The current flow during the period from point 2 to point 3 through diode 425 and is decaying.

If the switch 420 being opened does not bring about a sufficient decay, i.e., if the current continues to climb as shown by the dotted lines in FIG. 15, at point 4, switch 423 is opened. This is to prevent a run-away circuit caused by current regeneration, i.e., current being added to the system by motor e.m.f.

In FIG. 15, the distance $x$ represents the time $w$ which the current decays. Thus, it is seen that the current is maintained between $Y_1$ and $Y_2$ as shown in FIG. 15.

Returning to the condition shown in FIG. 10, i.e., with the current reversed and the motor reversed, in running forward, the current tends to build up and results in too much current, i.e., over that commanded by the computer.

Figure 11:
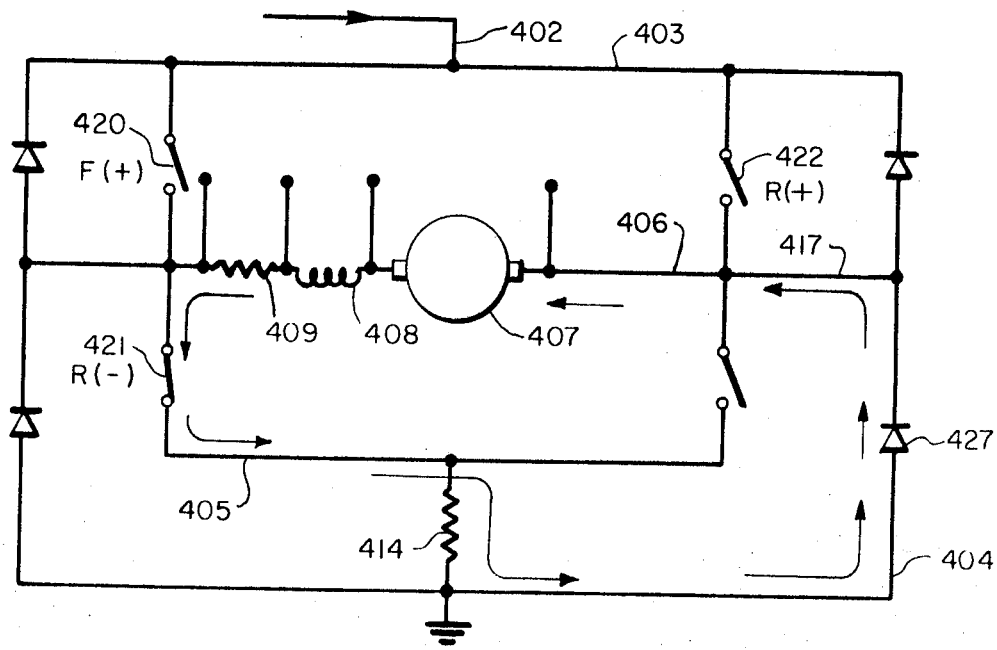
FIG. 11 is a circuit diagram showing the current flow during a period of current decay.

When the current reaches a sufficient level, the reverse (+) switch opens and the current begins to flow as shown in FIG. 11, through motor 407, through closed switch 421, resistor 414, around loop 404 and through diode 427.

Figure 12:
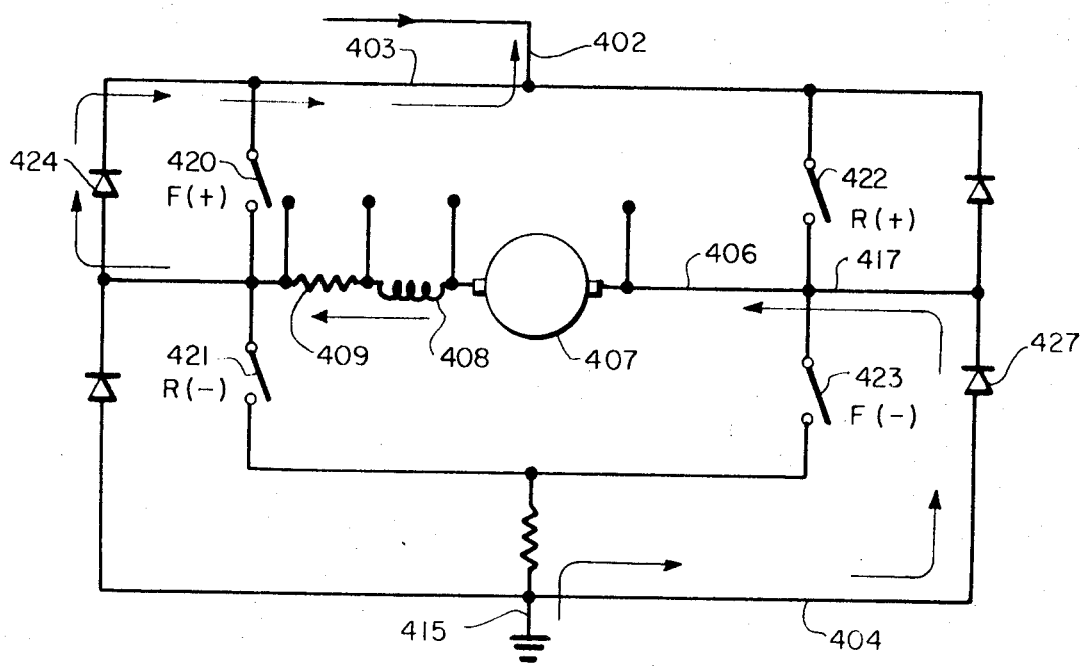
FIG. 12 is a circuit diagram of the present circuit showing the current flow as energy is fed back into the system.

If the velocity of motor 407 is high enough, the current will flow as indicated by the arrows in FIG. 11 but the current will continue to build up. The control looks at the current and determines if the measured current is higher than the allowed current. If the current is too high, the other reverse switch 421 is opened, resulting in the current flow as shown in FIG. 12. At this point, energy is being pumped back into the system, i.e., the stored energy of the table goes back to the supply. As the power dissipates, the reverse (−) switch is again closed and, if necessary, reopened, until the current drops to the acceptable limit.

The plus and minus torque in opposite directions is the same, i.e., the system does not know which is plus and which is minus. The system is symmetrical.

Figure 13:
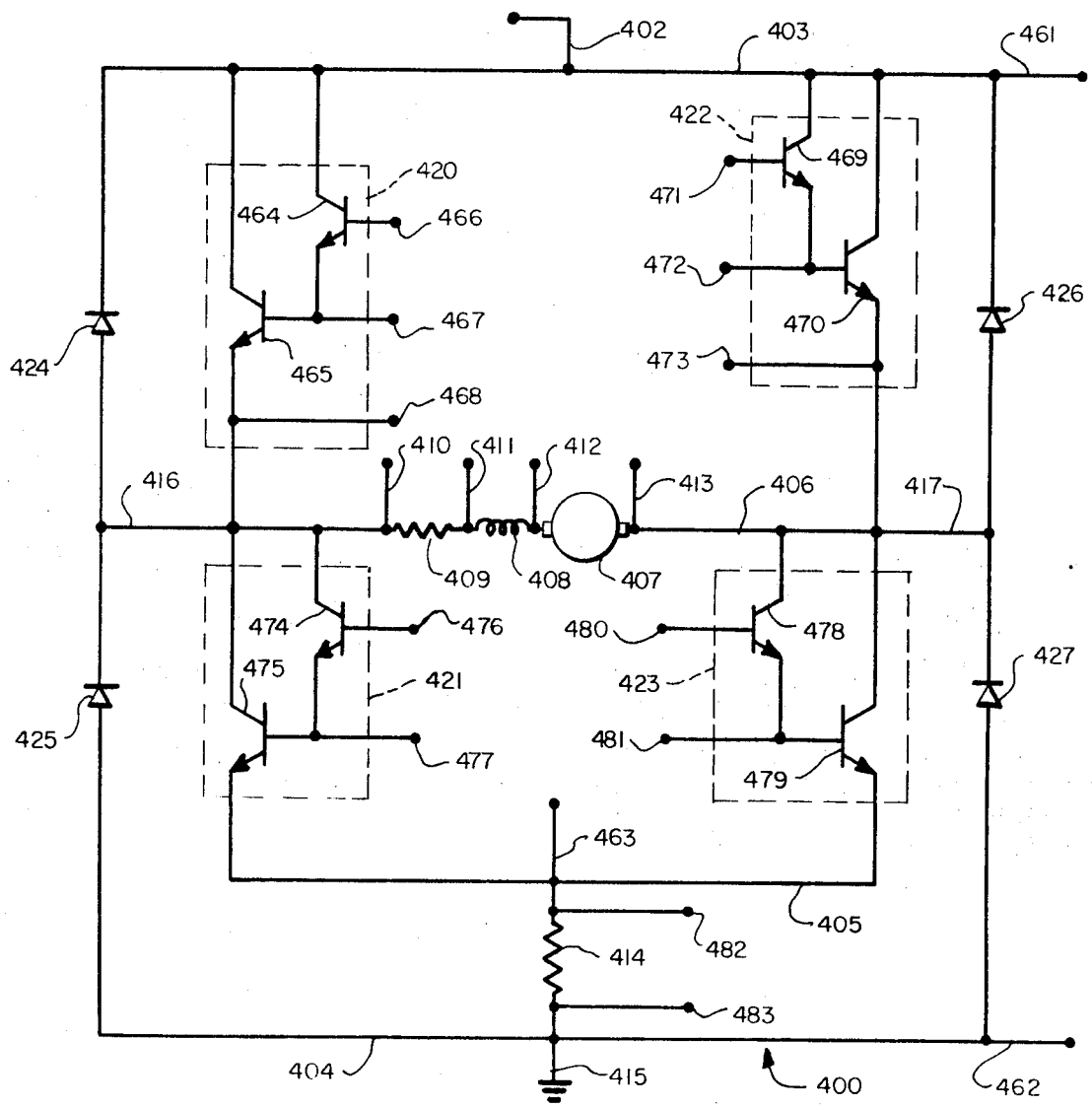
FIG. 13 is a more detailed circuit diagram of the bridge circuit of the present invention.

FIG. 13 shows the circuit comprising the present invention. In reality, it is part of the circuit shown in FIG. 4 only rearranged for clarity. Switch 420 is, in reality, a pair of transistors 464 and 465 arranged as shown. There are three leads, 466, 467 and 468, by which the switch is opened or closed by a logic signal. Switch 421 is composed of transistors 474 and 475 having power leads 476 and 477. Switch 422 is comprised of transistors 469 and 470 and leads 471, 472 and 473. Switch 423 is composed of leads 480 and 481 and transistors 478 and 479.

A pair of leads 482 and 483 are used in a voltage sensor to determine the voltage across resistor 414 which represents the absolute value of the current through the motor or the motor's torque.

The bridge circuit described is a completely solid state system.

The four point pickup by leads 410 through 413 gives the voltage generated by the motor. It is better than a linear velocity readout of the machine since it is simple and there is no loss in mechanical parts, etc.

The system described is completely general and can be employed to run any servo system, especially those involving two or three axes positioning of heavy tables.

The advantages of using a D.C. permanent magnet motor in a solid state bridge circuit is that it has a high response, the power dissipation is low, current can be put in the motor in either direction.

The bridge circuit is particularly adaptable for use with closed loop programmed control using a digital computer of the type described. With this type of computer, the system adds or subtracts and the error sends out a correcting signal. These signals control the time of opening and closing of the transistorized switches as previously described.

In the present system, the drive logic functions to prevent switch overlap, determines current polarity and magnitude, sets the overcurrent limit and sets the minimum time to allow the stored charge to dissipate.

Figure 5:
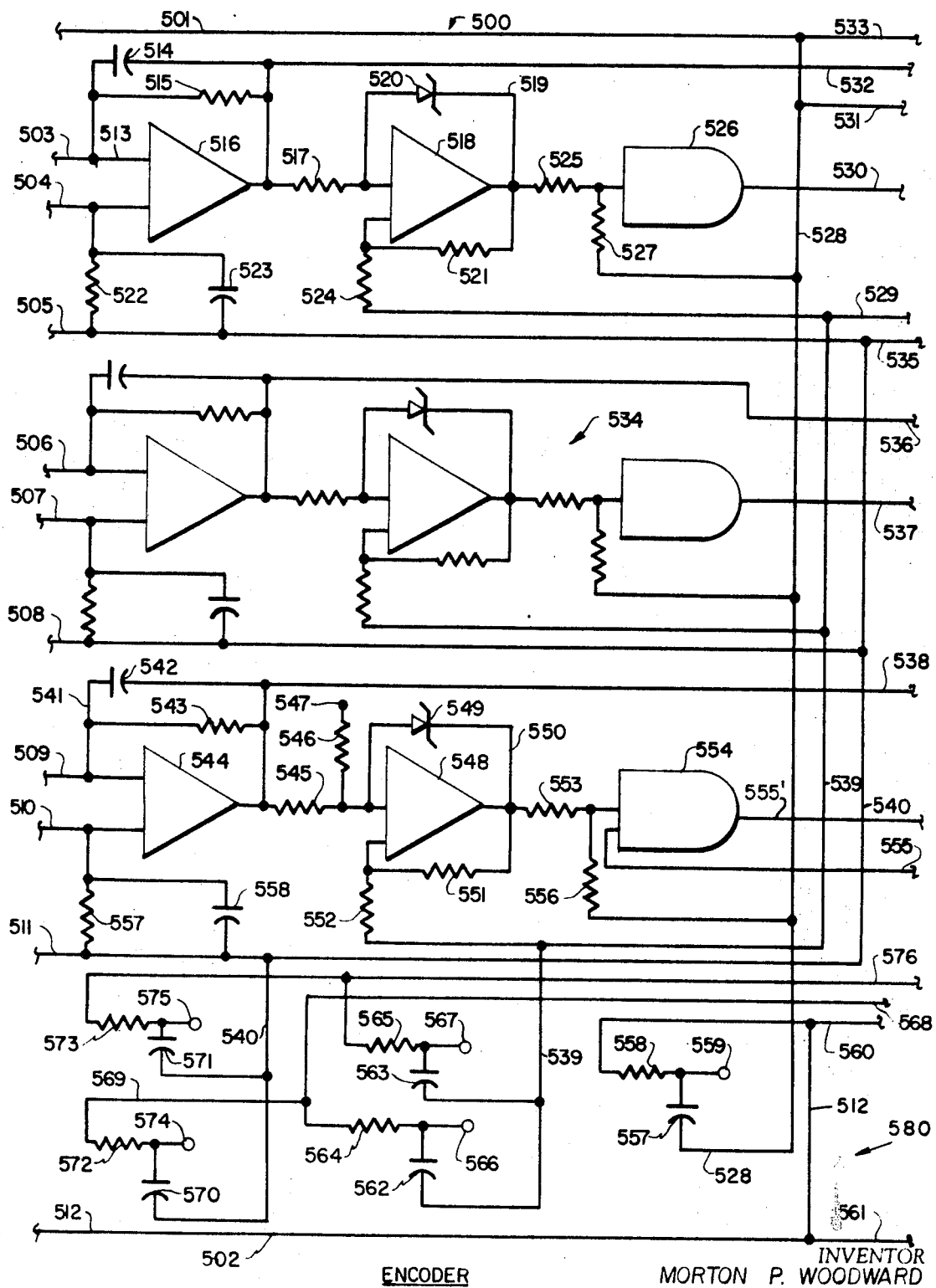
FIG. 5 is a schematic showing the encoder circuit.

Referring to FIG. 5, there is shown one half of the encoder assembly, generally designated as 500. The one shown is for the X-axis, it being realized that another is mounted essentially in parallel across lines 501 and 502, the only direct connection between the two circuits being lead 576 which would connect with its counterpart line on the encoder for the Y-axis.

Referring again to FIG. 5, there are shown lines 501 and 502. Lines 501 and 502 originate with a plus five volt ground in the photocells (not shown) in the scale (not shown) for the X-axis.

Leads 503 and 504 are also connected to a first photocell, lead 503 being the input and lead 504 being a return. Lead 505 is a ground. Leads 506 and 507 are input and return, respectively, to a second photocell and lead 508 is a ground.

Leads 509 and 510 are home pulse input and return leads, respectively, to a third photocell (not shown). Lead 511 is a ground.

Looking at the topmost subcircuit in FIG. 5, it is seen that lead 503 is connected to line 513 and an operational integrated circuit gain amplifier 516. Line 513 has a parallel circuit which contains capacitor 514 and resistor 515.

Amplifier 516 is connected via resistance 517 to a squaring circuit operational amplifier 518. Amplifier 518 acts to chop off the peaks of the pulses received resulting in a square wave rather than a sine wave. It also clips the pulses to either plus 5 volts and zero volts digital. It accomplishes this in conjunction with zener diode 520, line 519 and resistors 521 and 524.

Amplifier 518 is connected via resistor 525 to NAND gate 526.

Leads 529 through 533 and 535 through 538 comprise part of the interface with the computer (not shown in circuit detail). Lead 533 comprises the end of ground line 501. Lead 532 is a lead originating in the parallel circuit on line 513 and is a test point for the circuit. Lead 530 is directly connected to NAND gate 526 and is the output from the first photocell. Lead 529 is connected to resistor 524 and is an analog ground as is lead 535.

Subcircuit 534 is identical with the subcircuit just described with lead 536 similar to lead 532 and lead 537 similar to lead 530 only being the output from the second photocell.

A series of lines 528, 539 and 540 are used to connect the various subcircuits in parallel. Lead 531 is a five (5) volt digital ground off of line 528. Line 528 connects with line 501, line 539 connects with lead 529 and line 540 connects with lead 535.

The circuit for receiving the home pulse and return from leads 509 and 510 is similar to both of the subcircuits for the first and second photocells. It contains operational amplifier 544 with its accompanying resistors 543, 545, and 557 and capacitors 542 and 558. Also within the circuit is squaring amplifier 548 with its accompanying resistors 551 through 553 and zener diode 549.

A lead 547, however, is connected, via resistor 546, between amplifiers 544 and 548 and is connected to a plus 15 volt source.

NAND gate 554 is positioned in the circuit with resistor 556 in the same manner as power gate 526 but has a lead 555 going to the computer, the lead adapted to carry the signal to gate the home pulse.

Lead 555' provides the home pulse output from gate 554 to the computer. Lead 538 is connected to the parallel circuit containing capacitor 542 and resistor 543 and is a test point similar to point 532.

Line 539 terminates at resistor 552 and line 528 is connected with resistor 556.

Connected between line 540 and line 502 is subcircuit 580. This circuit represents, in reality, interconnections with the operational gain amplifiers, squaring circuit and gates in the above three subcircuits and comprise a power supply filtering circuit.

Between lead 576, which connects with a circuit identical with circuit 500 only for the Y-axis, and line 540 (extended) is lead 575, resistor 573 and capacitor 571. Lead 575 connects with plus 15 volt pins on the three operational gain amplifiers such as 516.

Mounted between line 540 and lead 568, which connects to a minus 15 volt source is lead 574, resistor 572 and capacitor 570. Lead 574 is connected to a minus 15 volt pin on the three operational gain amplifiers such as 516.

Mounted between lead 568 and line 539 (extended) is a circuit containing lead 566, capacitor 562 and resistor 564. Lead 566 is connected to a minus 15 volt pin on the three squaring circuit amplifiers such as 518.

Adjacent the previous circuit and mounted between line 539 and lead 576 is a circuit containing lead 567, resistor 565 and capacitor 563. Lead 567 connects with a plus 15 volt pin on the three squaring circuit amplifiers such as 518.

Mounted between lead 560, which connects with a plus 5 volt source, and line 528 is a circuit containing lead 559, capacitor 557 and resistor 558. Lead 559 is connected to a plus 5 volt pin on each of the three NAND gates such as 526.

A line 512 connects lead 560 with line 502. Line 502 carries a 5 volt charge to the photocells in the scale heads.

All of the leads on the right hand edge of FIG. 5 are connected to the computer control logic card. Since the information comes in at up to 20 kilohertz, which is faster than the computer can handle it, some of the information is stored within the buffer register which is item 120 shown in FIG. 1.

The computer can pick up the information on its next scan. It looks at the indicated position and then adds or subtracts it from the last command programmed position.

The scale heads used to indicate position are not shown but are conventional off-the-shelf items which use three photocells and a graduated scale comprising a series of slots to give out position pulses. They are linear glass scales which give out a pulse in precise intervals, such as every one-half of a one-thousandth of an inch.

It, of course, would be obvious to add a third circuit similar to that shown in FIG. 5 for X-Y-Z positioning.

Referring now to FIG. 16, there is shown a present system 700 for using the concepts involved in this invention to operate banks of machine tools.

The system consists of a main 4K memory supervisory computer 702 which is programmed through teletype 701. Attached operationaly to computer 702 is an interface box 703 which in turn is connected to a 160K memory storage drum 704. Box 703 contains a drum control means and a multiplexer. By the use of standard telephone lines such as 705, 706, and 707, or direct wire connections, the computer may be connected to a series of worker computers 708, 714 and 720, each having, for example, an 8K memory.

Each worker computer has an interface box 709, 715 and 721, respectively, which has an axis control means and a timing switch.

While each of the worker computers can operate an unlimited number of machine tools, it has been found that, with an 8K memory, four machine tools is an agreeable number. This limitation on the number of machine tools depends on the computer memory size and its operational speed.

Computer 708, as seen in FIG. 16, operates a component sequencing machine 713 (abbreviated SEQ on the Figure) such as that described in U. S. Pat. No. 3,421,284, a dual center distance component insertion machine 712 (abbreviated DCD on the Figure) such as described in copending U. S. application Ser. No. 876,726, filed Nov. 14, 1969 and now U.S. Pat. No. 3,593,404 entitled "MULTI-SIZE DUAL CENTER DISTANCE ELECTRONIC COMPONENT INSERTION MACHINE," and two variable center distance component insertion machines, 710 and 711 (abbreviated VCD in the Figure) such as described in copending U. S. application Ser. No. 755,233 "MULTI-SIZE VARIABLE CENTER ELECTRONIC COMPONENT INSERTION MACHINE " filed Aug. 26, 1968 and now U.S. Pat. No. 3,539,086.

Computer 714 operates a sequencer 718, a VCD 716, a DCD 717 and a wire wrapping apparatus of the type where an X-Y axes positioning table is moved under a wire wrap but which wraps wires around terminal studs mounted on a circuit board held on the table. The VCD and DCD apparatus also uses X-Y axes positioning tables underneath a component insertion mechanism. The sequence is essentially a linear operation with certain functions designated to be performed at designated times.

Computer 720 operates sequencer 723, wire wrap apparatus 722 and DCDs 724 and 725.

All the computers are general-purpose digital types. Computers 708, 714 and 720 can be located in different geographical areas when telephone lines are used to relay the commands from supervisory computer 702.

The system is set up so that the information from storage drum 704 is reconstituted back into teletype format. It codes it as if it were direct teletype information so that computers 708, 714 and 720 believe it is information direct from the teletype. This feature was incorporated so that each worker computer can be run directly from a teletype without any change in the system, i.e., a teletype can be plugged right into each worker computer.

While there has been one embodiment described and shown in the present invention, it will be obvious that many changes and modifications will occur to those of ordinary skill in the art without departing from the scope of the appended claims.

We claim:

1. In a direct computer controlled digital positioning system, the combination comprising a material support member, at least two motor means, one means for moving said material support member in either direction along one axis and said second means for moving said material support member in either direction along a second axis, programmed command means for causing said motor means to move said material support member to a programmed location, said commands being in the form of digital velocity signals indicating the motor means velocity needed to reach a position along each of said axes, means disposed along each of said axes to detect the actual location of said material support means by measuring the position increments of the material support member, velocity feedback means adapted to amplify the actual velocity signals of said motor means, said programmed command means including means to compare said command velocity signals with said velocity feedback signal and to correct the command velocity signal depending on the actual location of said material support member, means to detect and amplify the actual current in each of said motor means and to feed it back to said command means, logic means in said command means adapted to compare the corrected command signal with said current feedback signal and to modify the current through said motor means to achieve said command velocity.

2. In a direct computer controlled digital positioning system, the combination comprising a movable table at least two motor means, one means for moving said movable table in either direction along one axis and said second means for moving said movable table in either direction along a second axis, programmed command means for causing said motor means to move said movable table to a programmed location, said commands being in the form of digital signals indicating the motor means velocity needed to reach said programmed location along each of said axes, means disposed along each of said axes to detect the actual location of said table, velocity feedback means, said programmed command means including means to compare said command velocity signals with said velocity feedback signal and to correct the command velocity signal depending on the actual location of said table, means to detect and amplify the actual current in each of said motor means and to feed it back to said command means, logic means in said command means adapted to compare the corrected command signal with said current feedback signal and to modify the current through said motor means to achieve said command velocity.

3. In a computer controlled digital positioning system, the combination comprising a material support member, at least two motor means, one means for moving said material support member in either direction along one axis and said second means for moving said material support member in either direction along a second axis, programmed command means for causing said motor means to move said material support member to a programmed location, said commands being in the form of digital velocity signals indicating the motor means velocity needed to reach a position along each of said axes, means including photocell means disposed along each of said axes to detect the position increments of the material support member, velocity feedback means, said programmed command means including means to calculate actual position using said detected position increments, means to compare said command velocity signals with said velocity feedback signal and to change the command velocity signal depending on the actual location of said material support member; means to detect and amplify the actual current in each of said motor means and to feed it back to said command means, said command means adapted to compare the corrected command signal with said current feedback signal and to modify the current through said motor means to achieve said command velocity.

4. In a direct computer controlled digital positioning system, the combination comprising a movable member, two motor means, one means for moving said movable member in either direction along one axis and said second means for moving said movable member in either direction along a second axis, programmed control means for causing said motor means to move said movable member to a programmed location, said control means adapted to create commands being in the form of digital velocity signals indicating the motor means velocity needed to reach a position along each of said axes, means disposed along each of said axes to detect the actual location of said movable member by measuring the position increments of the movable member, velocity feedback means, said programmed control means including means to compare said command velocity signals with said velocity feedback signal and to increase or decrease the command velocity signal depending on the actual location of said movable member, means to detect and amplify the actual current in each of said motor means and to feed it back to said control means, internal logic means in said control means adapted to compare the corrected command signal with said current feedback signal and to modify the magnitude, the direction or the magnitude and direction of said motor means current to achieve said command velocity.

5. In a system including a machine tool, a support member and an electronic digital computer for automatically controlling the tool to perform a series of operations at a programmed location on the support member and for moving the support member by means of a corresponding digitally programmed instruction, the combination comprising a movable support member, position control means including at least one servomotor operatively coupled to said support member for moving said member along a particular axis, and a motion control circuit coupled to said servomotor for controlling the operation thereof; a motion detecting means for detecting the motion of said support member along said axis and for generating electrical pulses representing said motion, one pulse being generated upon the completion of each predetermined increment of travel of said support member along said axis, said digital computer adapted to change in response to said motion detecting means the signals to said servomotor to increase or decrease its velocity, means adapted to detect the actual current in said servomotor and to feed it back to said position control means; and said position control means adapted to modify the current through said servomotor.

6. In a system including a machine tool, a support member and a digital computer for automatically controlling the tool to perform a series of operations at a programmed location on the support member and for moving the support member by means of a corresponding digitally programmed instruction, the combination comprising a movable support member, position control means including two servomotors operatively coupled to said support member for moving said member along particular axes, and a motion control circuit coupled to said servomotors for controlling their operation, a motion detecting means for detecting the motion of said support member along said axes and for generating electrical pulses representing said motion, one pulse being generated upon the completion of each predetermined increment of travel of said support member along said axes, , means adapted to detect the actual current in said servomotors and to feed it back to said position control means, and said digital computer and said motion control circuit adapted to change the current through the servomotors in response to said motion detecting means and said feedback current, respectively.

7. In a system including a machine tool, a support member and an electronic digital computer for automatically controlling the tool to perform a series of operations at a programmed location on the support member and for moving the support means by means of a corresponding digitally programmed instruction, the combination comprising a movable support member, solid state position control means including two servomotors operatively coupled to said support member for moving said member along particular axes, and a solid state motion control circuit associated with said servomotors for controlling their operation; motion detecting means for detecting the motion of said support member along both of said axes and for generating electrical pulses representing said motion, said detecting means adapted to generate one pulse upon the completion of each predetermined increment of travel of said support member along said axes, said digital computer adapted to receive said pulses and to change the signals to said servomotors to increase or decrease their velocity, solid state feedback means adapted to detect the actual current in said servomotors and to feed it back to said position control means, and said digital computer and said control circuit adapted to change the current through the servomotors in response to said motion detecting means and said feedback means, respectively.

* * * * *